Patented June 20, 1939

2,163,268

UNITED STATES PATENT OFFICE 2,163,268

METHOD FOR MAKING CYCLIC ESTERS

Wallace Hume Carothers, Arden, and Julian Werner Hill, Wilmington, Del., assignors to E. I. du Pont de Nemours & Company, Wilmington, Del., a corporation of Delaware No Drawing. Application December 12, 1933, Serial No. 701,980

9 Claims. (Cl. 260—338)

This invention relates to the preparation of cyclic esters having more than seven atoms in the ring. More specifically it relates to a method of increasing the yield of these esters by suppressing the formation of undesirable compounds.

It is well known that cyclic esters having more than seven atoms in the ring, such as, for example, the lactone of ω-hydroxypentadecanoic acid, cannot be obtained by the ordinary methods for preparing five or six membered lactones. These higher cyclic esters have hitherto been prepared only by very laborious and complicated methods and the yields have been small.

Applicants, in their copending application, Serial No. 657,408, filed February 18, 1933, now U. S. Patent 2,020,298, have described a method of preparing many-membered cyclic esters by depolymerizing linear polyesters.

It is an object of this invention to provide a process of preparing cyclic esters having more than seven atoms in the ring. It is a further object of this invention to provide a simple and direct method of preparing these esters which will also result in higher yields. Other objects will appear hereinafter.

These objects may be accomplished by bringing about the cyclic ester formation in the presence of an inert liquid at high dilution. The inert liquid should be a solvent for the reacting material, or materials.

Example

One part of ω-hydroxypentadecanoic acid is dissolved in 1000 parts of dry xylene containing a very small amount (about .01 of one part) of p-toluenesulfonic acid to act as a catalyst for esterification. The solution is heated to boiling under a reflux condenser for a period of one hour or more and the xylene together with any water formed is then slowly distilled through a column. The residual material is found to contain the lactone of ω-hydroxypentadecanoic acid, which is easily recognized on account of its very intense and highly characteristic odor.

In carrying out the process of the present invention any indifferent solvent having a sufficiently high boiling point may be used. By an indifferent solvent in this connection we mean a liquid which is not readily capable of being esterified and does not hydrolyze or react with the ester product to an important extent under the conditions used. As examples of such compounds we may mention aromatic and aliphatic hydrocarbons, aromatic and aliphatic ethers, ketones, and aromatic and aliphatic halogen compounds. Among the specific compounds may be mentioned xylene, toluene, the product sold commercially as "Hi-flash" naphtha, chlorobenzene, $\beta,\beta'$-dichlordiethyl ether, acetylene tetrachloride, cyclohexanone and dibutyl ether. In this method of establishing the ester linkage by direct esterification of a carboxyl group by a hydroxyl group, the boiling point of the solvent should be in general above 100° C., although this is by no means necessary and the unfavorable effect of a lower boiling point may, of course, be eliminated by the application of pressure. It is desirable to use a water-immiscible solvent so that water of reaction can be readily removed. This is accomplished by distilling off water and solvent, separating the water, and returning the solvent continuously to the reaction vessel.

The various reactions described herein may be carried out at widely varying temperatures, the only limits being that the temperature must be high enough to cause reaction but not so high as to bring about decomposition of the reactants or reaction products. It has been found that the reaction can be very conveniently carried out in many cases at the boiling point of water, since any water of reaction must be removed. Certain solvents form with water binaries, boiling below the boiling temperature of water, and in such cases the reaction temperature can be conveniently maintained at the boiling temperature of the binary.

It is highly desirable in carrying out the direct esterification to have present an esterification catalyst, and for this purpose a mineral acid, such as sulfuric, phosphoric, hydrochloric, etc., or a strong organic acid, such as benzenesulfonic, p-toluenesulfonic, camphorsulfonic, or naphthalene sulfonic, may be used.

In the application of this process it is necessary to have present a sufficiently high ratio of solvent acting as a diluent to depress considerably the velocity of intermolecular reaction which brings about the formation of undesirable by-products. The minimum practical ratio of solvent to reacting compound will vary considerably with the nature of the latter, but in general no important effect of the solvent will be obtained unless its amount is at least twenty times greater than that of the reacting compounds. In general it is preferable to use at least one hundred times as much of the solvent as of the reacting compounds and as indicated in the example much greater amounts even than this will be used at times.

The method of this invention is applicable not only to the synthesis of lactone of ω-hydroxypentadecanoic acid described but also to the lactones of higher hydroxy acids generally. Other suitable hydroxy acids are: ω-hydroxy decanoic, ω-hydroxy dodecanoic, ω-hydroxy tridecanoic. The method may also be used with equal success for the synthesis of cyclic esters derived jointly from dibasic acids and dihydric alcohols. As an example of such an ester we may mention cyclic monomeric ethylene sebacate having the formula:

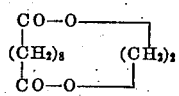

which is described in the co-pending application of Carothers and Hill, referred to above. When sebacic acid and ethylene glycol are heated together reaction occurs and an ester having the same mass formula as that above results. However, this product is a polyester and not the cyclic monomeric ester described above. According to the process of the present invention, if the ethylene glycol and sebacic acid are allowed to react at low concentration in the presence of a large excess of an inert diluent, the course of the reaction is changed in such a way that the desired cyclic ester tends to be formed instead of the polyester. This method may also be applied to other esters derived jointly from dibasic acids and dihydric alcohols, such as those derived from the acids oxalic, malonic, succinic, glutaric, adipic, suberic, pimelic, azelaic, brassylic, and tetradecamethylenedicarboxylic, and from the glycols, ethylene glycol, propylene glycol, butylene glycol, trimethylene glycol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, tetradecamethylene glycol, diethylene glycol, triethylene glycol, etc.

The process of the invention may also be extended to the preparation of many-membered cyclic esters by reactions other than direct esterification, and for this purpose it is essential only that all the reactants be of such a nature that they can be simultaneously dissolved in an inert diluent. It is, for example, possible to obtain ethylene sebacate by the action of diphenyl sebacate on ethylene glycol. The reaction in this case consists in ester interchange rather than esterification, phenol instead of water being eliminated as the second reaction product. If the diphenyl sebacate is placed in an inert solvent at very low concentration together with an equivalent amount of ethylene glycol this ester interchange will proceed in such a manner as to yield a predominating amount of the monomeric cyclic ester, the formation of polyester being suppressed by the presence of the diluent.

The method of the present invention may also be applied to the synthesis of cyclic esters from a glycol and dibasic acid halide. In such cases, tertiary amines are desirable as catalysts. For example, a 1 molar solution of phosgene (acid chloride of carbonic acid) in toluene and a 1 molar solution of decamethylene glycol in pyridine are added separately and simultaneously at a very slow and exactly equal rate to a reaction flask which contains a solvent such as toluene or pyridine, or a mixture of the two. Reaction of the phosgene with decamethylene glycol occurs under the catalytic influence of the pyridine, and owing to the fact that the simultaneous concentration of these reactants in the reaction mixture at any given time is very low, the formation of monomeric cyclic esters is favored, rather than that of the undesirable polyester. The process of the present invention can also be successfully carried out with other ester-forming reactants. Specifically a compound such as

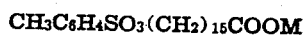

or $Br(CH_2)_{15}COOM$, where "M" is a metal, may be caused to react with itself in high dilution. The latter reaction should be carried out in a medium capable of dissolving the salt. As a still further method, a derivative of a glycol such as the di-p-toluenesulfonic ester

may be caused to act on a salt of a dibasic acid. "X" in the foregoing formula has a minimum value of two to four, depending on the acid, and has no set maximum value. In cases of this kind it is possible to use even such reactive solvents as water for the reacting medium and to carry out the reaction at a temperature considerably below 100° C.

The many-membered cyclic esters are in many cases odorous compounds of great value. Many of them such as the lactone of ω-hydroxypentadecanoic acid, tetradecamethylene carbonate, and ethylene sebacate have odors closely resembling those of natural musk. At the same time they possess the extraordinary fixative power which is characteristic of natural musk but is absent from most synthetic musks. The present invention provides a simple and direct method for their preparation. By the process of this invention it is possible also to obtain high yields of a pure product. In addition the method herein described may be applied to a wide variety of syntheses. Other advantages will be apparent from the above description and specific example.

The term "radical length", as used herein and in the claims to characterize the reactants, indicates those atoms in the chains of the glycol, dicarboxylic acid, hydroxy acid, or ester-forming derivative thereof, as the case may be, which become annular atoms in the cyclic ester produced. Thus the radical length of a glycol is equal to the number of atoms in the chains between the hydroxyl groups, plus the two hydroxyl oxygen atoms; that of a dicarboxylic acid is the number of atoms in the chains between the carboxyl groups, plus the two carboxyl carbons; and that of a hydroxy acid is the number of atoms in the chains between the carboxyl and hydroxyl groups, plus the carboxyl carbon and the hydroxyl oxygen. Carbonic acid has a radical length of one.

It is apparent that many widely different embodiments of this invention may be made without departing from the spirit and scope thereof, therefore, it is not to be limited except as indicated in the appended claims.

We claim:
1. The process of preparing the lactone of ω-hydroxypentadecanoic acid which comprises boiling a mixture of one part of ω-hydroxypentadecanoic acid in at least 1,000 parts of dry xylene, to which has been added .01 of one part of paratoluenesulfonic acid, for at least 60 minutes and then slowly distilling off the xylene and water of reaction.

2. A method of preparing cyclic monomeric ethylene sebacate which comprises reacting ethylene glycol and sebacic acid in the presence of a large amount of an inert liquid which is a solvent for the reactants.

3. The process of claim 2, characterized in that the inert solvent is xylene.

4. A process which comprises heating aliphatic ester-forming substances of such character as to give cyclic esters having more than seven annular atoms in the presence of an at least one hundred-fold quantity of an inert organic liquid which is a solvent for the reacting material.

5. A process which comprises heating an aliphatic monohydroxy monocarboxylic acid having at least six atoms in the chain between the hydroxyl and the carboxyl groups in the presence of an at least one thousand-fold quantity of an inert organic liquid which is a solvent for the hydroxy acid.

6. A process which comprises heating an aliphatic dicarboxylic acid and an aliphatic dihydric alcohol so selected that the sum of the atoms in the chain between the carboxyl groups of the acid and the hydroxyl groups of the alcohol is at least four, in the presence of an at least one thousand-fold quantity of an organic liquid which is a solvent for said acid and alcohol.

7. The process according to claim 4 in which the reaction is carried out in the presence of a mineral acid.

8. The process according to claim 4 in which the reaction is carried out in the presence of a strong organic acid.

9. A process which comprises heating aliphatic ester-forming substances of such character as to give cyclic esters having more than ten annular atoms in the presence of an at least one hundred-fold quantity of an inert organic liquid which is a solvent for the reacting material.

WALLACE H. CAROTHERS.
JULIAN W. HILL.